United States Patent
McCumber et al.

(10) Patent No.: US 11,518,527 B2
(45) Date of Patent: Dec. 6, 2022

(54) AUTOMATIC EJECTION SEAT PERFORMANCE OPTIMIZATION BASED ON DETECTION OF AIRCREW WEIGHT

(71) Applicant: AMI Industries, Inc., Colorado Springs, CO (US)

(72) Inventors: Ronald John McCumber, Colorado Springs, CO (US); Casey Andrew Stribrny, Colorado Springs, CO (US); Nicholas K. Bharucha, Colorado Springs, CO (US); John Hampton, Colorado Springs, CO (US); Kassidy L. Carson, Colorado Springs, CO (US); Bradley Mastrolia, Colorado Springs, CO (US); Steve Holstine, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 211 days.

(21) Appl. No.: 17/036,229

(22) Filed: Sep. 29, 2020

(65) Prior Publication Data
US 2022/0097858 A1  Mar. 31, 2022

(51) Int. Cl.
*B64D 25/10* (2006.01)
*G01G 19/44* (2006.01)

(52) U.S. Cl.
CPC .............. *B64D 25/10* (2013.01); *G01G 19/44* (2013.01)

(58) Field of Classification Search
CPC ................................. B64D 25/10; G01G 19/44
See application file for complete search history.

(56) References Cited

U.S. PATENT DOCUMENTS

| 3,706,434 A | 12/1972 | Martin |
| 4,673,147 A * | 6/1987 | Solomonides ......... B64D 25/10 244/122 A |
| 4,846,421 A * | 7/1989 | Trikha .................... B64D 25/10 244/141 |
| 5,558,301 A | 9/1996 | Kerdoncuff et al. |
| 6,254,126 B1 * | 7/2001 | Bauer .................... B60N 2/002 701/45 |
| 8,276,845 B2 | 10/2012 | Orgerie et al. |

(Continued)

FOREIGN PATENT DOCUMENTS

| CN | 107804468 | 3/2019 |
| CN | 109573051 | 4/2019 |

(Continued)

OTHER PUBLICATIONS

European Patent Office; European Search Report dated Feb. 23, 2022 in Application No. 21198208.7.
European Patent Office; European Search Report dated Feb. 11, 2022 in Application No. 21199831.5.
European Patent Office; European Search Report dated Feb. 23, 2022 in Application No. 21198332.5.
European Patent Office; European Search Report dated Feb. 11, 2022 in Application No. 21199112.0.

(Continued)

*Primary Examiner* — Richard G Davis
(74) *Attorney, Agent, or Firm* — Snell & Wilmer L.L.P.

(57) ABSTRACT

A system for automatic optimization of an ejection system for an aircraft includes the ejection system having a plurality of adjustable settings. The system further includes a sensor configured to detect weight data corresponding to a weight of a user of the ejection system. The system further includes a controller coupled to the ejection system and to the sensor and configured to adjust at least one of the plurality of the adjustable settings of the ejection system based on the weight data.

17 Claims, 5 Drawing Sheets

(56) References Cited

U.S. PATENT DOCUMENTS

| | | | |
|---|---|---|---|
| 8,594,868 B2* | 11/2013 | Kell | B60L 7/24 |
| | | | 180/907 |
| 9,523,985 B1 | 12/2016 | Barnes | |
| 10,410,075 B2 | 9/2019 | Zebley et al. | |
| 10,543,798 B2* | 1/2020 | Desjardins | B64D 25/04 |
| 10,546,274 B2 | 1/2020 | Jobling et al. | |
| 11,300,078 B2* | 4/2022 | Benjamin | F02K 9/80 |
| 2008/0156602 A1* | 7/2008 | Hiemenz | F16F 9/53 |
| | | | 188/267.1 |
| 2011/0035118 A1* | 2/2011 | Hiemenz | F16F 15/002 |
| | | | 701/45 |
| 2015/0217780 A1 | 8/2015 | Chen et al. | |
| 2017/0106981 A1* | 4/2017 | Bolukbasi | G01G 19/44 |
| 2018/0162539 A1 | 6/2018 | Azizi Pourzadeh | |
| 2019/0266472 A1 | 8/2019 | Johnson | |
| 2020/0096072 A1* | 3/2020 | Kawecki | B60N 2/42 |
| 2020/0189756 A1 | 6/2020 | Salois et al. | |

FOREIGN PATENT DOCUMENTS

| | | |
|---|---|---|
| EP | 3798120 | 3/2021 |
| GB | 959900 | 6/1964 |
| RU | 2671896 | 11/2018 |
| WO | 2013120142 | 8/2013 |

OTHER PUBLICATIONS

USPTO; Pre-Interview OA dated in Mar. 24, 2022 in U.S. Appl. No. 17/036,336.
USPTO; Pre-Interview OA dated in Mar. 25, 2022 in U.S. Appl. No. 17/036,391.
USPTO; Notice of Allowance dated Aug. 3, 2022 in U.S. Appl. No. 17/036,336.
USPTO; Notice of Allowance dated Aug. 11, 2022 in U.S. Appl. No. 17/036,391.

* cited by examiner

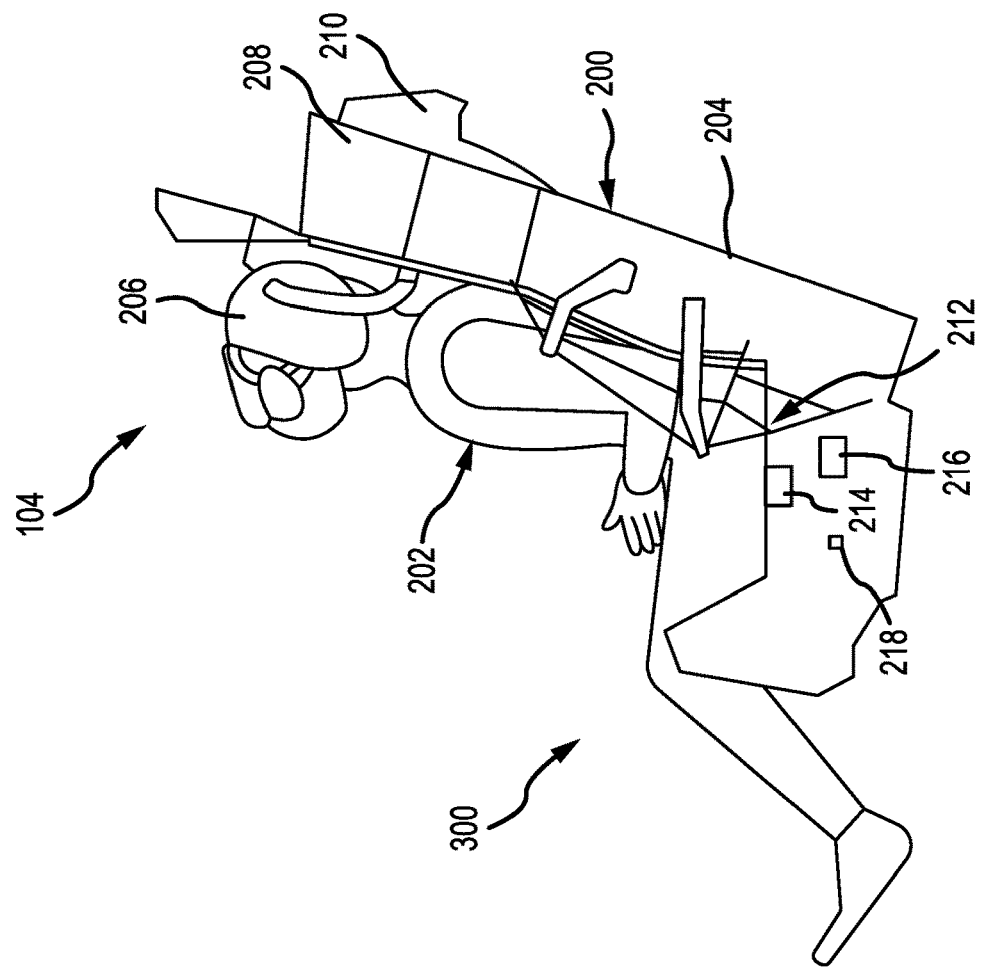
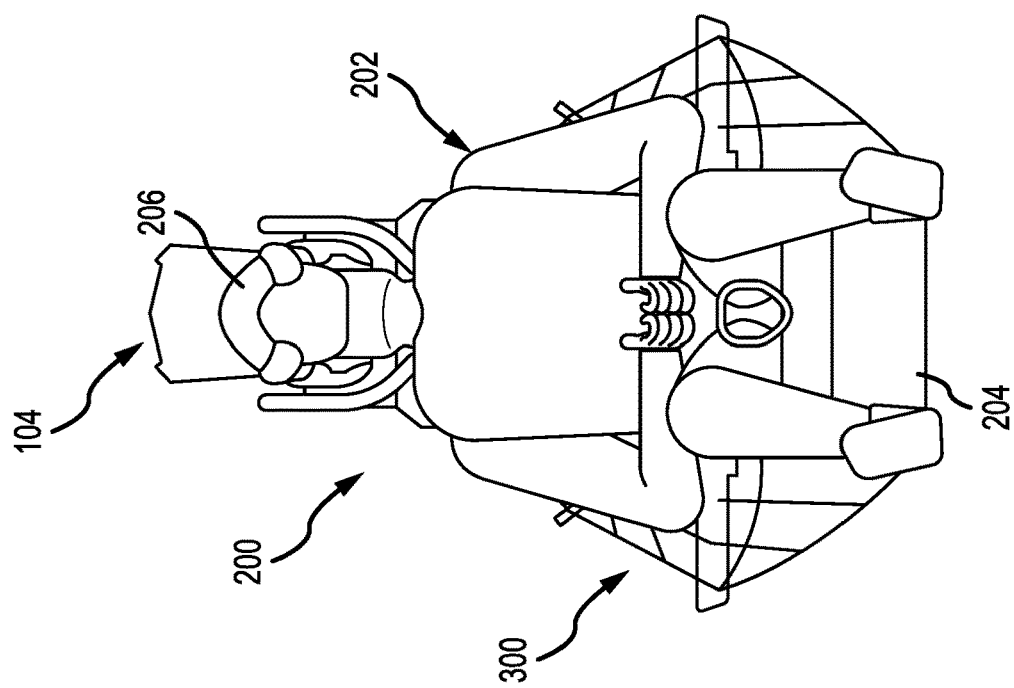

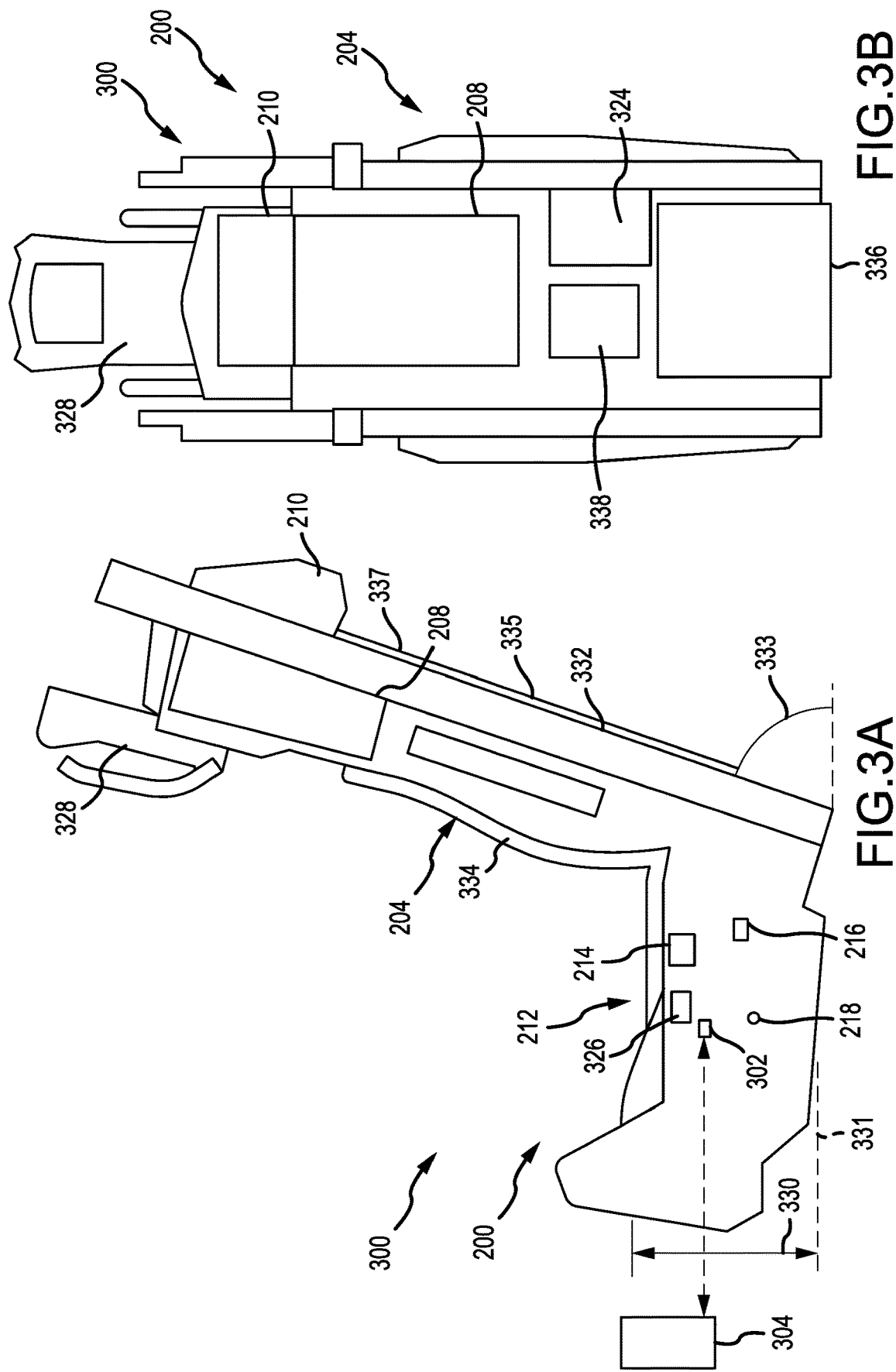

AUTOMATIC EJECTION SEAT PERFORMANCE OPTIMIZATION BASED ON DETECTION OF AIRCREW WEIGHT

FIELD

The present disclosure relates to ejection systems for aircraft and, more particularly, to automatic optimization of such ejection systems based on detected weight(s) of pilot(s).

BACKGROUND

Certain aircraft may include ejection systems designed to eject a member of the flight crew from the aircraft in certain situations. These ejection systems typically include an ejection seat in which the member of the flight crew is located during flight. The ejection seat may have various adjustable settings which are desirable to adjust based on parameters and preferences of the ejection seat and/or flight crew member. For example, the ejection seat may have settings related to timing of ejection, deployment of parachutes, adjustments to dimensions (e.g., lumbar support, seat height, headrest position), or the like. Currently, these settings are manually input during a pre-flight check. However, this is a time-consuming process as each setting is adjusted manually and separate from many other settings. These settings may include adjustments to various settings of the seat such as a height of a bucket portion of the seat.

SUMMARY

Disclosed herein is a system for automatic adjustment of an ejection system for an aircraft. The system includes the ejection system having a plurality of adjustable settings. The system further includes a sensor configured to detect weight data corresponding to a weight of a user of the ejection system. The system further includes a controller coupled to the ejection system and to the sensor and configured to adjust at least one of the plurality of the adjustable settings of the ejection system based on the weight data.

Any of the foregoing embodiments may further include a seat having a bucket portion, wherein the sensor includes at least one pressure sensor coupled to the bucket portion and configured to detect a pressure applied to the bucket portion of the seat.

Any of the foregoing embodiments may further include a seat having a bucket portion, wherein the sensor includes an actuator configured to exert a force to adjust a height of the bucket portion.

In any of the foregoing embodiments, the weight data includes an amount of force required to cause the height of the bucket portion to remain unchanged.

In any of the foregoing embodiments, the controller is further configured to calculate the weight of the user based on the amount of force required to cause the height of the bucket portion to remain unchanged.

In any of the foregoing embodiments, the controller is further configured to compensate for a current temperature in response to calculating the weight of the user.

Any of the foregoing embodiments may further include an input device configured to receive a desired adjustment to the height of the bucket portion, wherein the controller is configured to select the amount of force at a time at which the height of the bucket portion remains unchanged during an adjusting process of the height of the bucket portion.

In any of the foregoing embodiments, the ejection system includes a seat electronic sequencer and the plurality of the adjustable settings include at least one of a parachute deployment timing, a drogue deployment timing, or a thrust angle alignment.

In any of the foregoing embodiments, the ejection system includes an interseat electronic sequencer and the plurality of the adjustable settings include an interseat timing.

Also disclosed is a system for automatic adjustment of an ejection system for an aircraft. The system includes the ejection system having a plurality of adjustable settings. The system further includes a seat having a bucket portion in which a user of the ejection system rests. The system further includes a sensor coupled to the seat and configured to detect weight data corresponding to a weight of the user of the seat. The system further includes a controller coupled to the ejection system and to the sensor and configured to adjust at least one of the plurality of the adjustable settings of the ejection system based on the weight data.

In any of the foregoing embodiments, the sensor includes at least one pressure sensor coupled to the bucket portion and configured to detect a pressure applied to the bucket portion of the seat.

In any of the foregoing embodiments, the sensor includes an actuator configured to exert a force to adjust a height of the bucket portion, and wherein the weight data includes an amount of force required to cause the height of the bucket portion to remain unchanged.

In any of the foregoing embodiments, the controller is further configured to calculate the weight of the user based on the amount of force required to cause the height of the bucket portion to remain unchanged, and wherein the controller is further configured to compensate for a current temperature in response to calculating the weight of the user.

Also disclosed is a method for automatic adjustment of an ejection system of an aircraft. The method includes detecting, by a sensor, weight data corresponding to a weight of a user of the ejection system. The method further includes adjusting, by a controller, at least one of a plurality of adjustable settings of the ejection system based on the weight data.

In any of the foregoing embodiments, detecting the weight data includes detecting a pressure applied to a bucket portion of a seat by a pressure sensor.

In any of the foregoing embodiments, detecting the weight data includes detecting the weight data by an actuator that exerts a force to adjust a height of a bucket portion of a seat.

In any of the foregoing embodiments, detecting the weight data includes detecting an amount of force required to cause the height of the bucket portion to remain unchanged.

Any of the foregoing embodiments may further include calculating, by the controller, the weight of the user based on the amount of the force required to cause the height of the bucket portion to remain unchanged.

In any of the foregoing embodiments, calculating the weight of the user further includes compensating for a current temperature of the actuator.

Any of the foregoing embodiments may further include receiving, by an input device, a desired adjustment to the height of the bucket portion, wherein calculating the weight of the user includes selecting the amount of force at a time at which the height of the bucket portion remains unchanged during an adjusting process of the height of the bucket portion.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIGS. 2A and 2B illustrate a front view and a side view, respectively, of various features of an ejection system including an ejection seat, in accordance with various embodiments;

FIGS. 3A and 3B are side and back views, respectively, of the ejection seat of FIGS. 2A and 2B, in accordance with various embodiments;

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
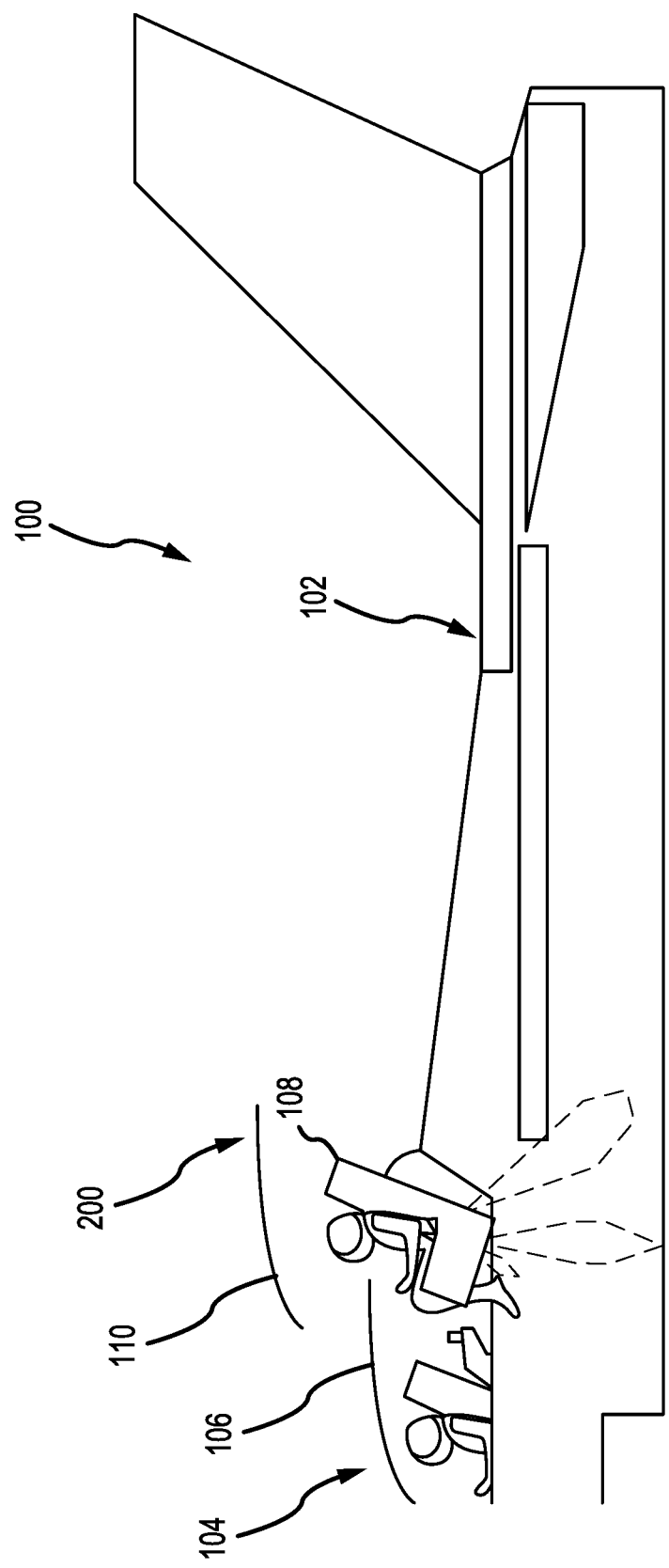
FIG. 1 illustrates an aircraft having two cockpits with respective ejection systems and a system for adjusting settings of the ejection systems, in accordance with various embodiments.

Referring now to FIG. 1, an aircraft 100 may include a fuselage 102. The fuselage 102 may define or include a cockpit 104 in which one or more member of a flight crew may be located. The fuselage 102 may further define or include a second cockpit 108 in which one or more member of a flight crew may be located. In various embodiments, the cockpit 104 may include one or more ejection system to facilitate ejection of one or more member of the flight crew. In that regard, the first cockpit 104 may include a hatch or canopy 106 that separates from or moves relative to the first cockpit 104 to allow the member or members of the flight crew in the first cockpit 104 to eject from the fuselage 102. The second cockpit 108 may further include a hatch or canopy 110 that separates from or moves relative to the second cockpit 108 to allow the member or members of the flight crew in the second cockpit 108 to eject from the fuselage 102. The aircraft 100 may be a passenger aircraft, a cargo aircraft, a military aircraft, or the like.

Referring now to FIGS. 2A and 2B, an exemplary ejection system 200 may be included in the cockpit 104. In particular, the ejection system 200 may include a seat 204 on which a user 202 may sit or otherwise rest and a helmet 206 which may be supported on a head of the user 202. The seat 204 may include various components of the ejection system 200 such as a main parachute 208 and a drogue 210. The seat 204 may further include a catapult or rocket that ejects the seat 204 and any occupant thereof from the cockpit 104. The drogue 210 may be a parachute that initially deploys after ejection of the seat 204 and may reduce a velocity of the seat 204 as it travels towards a ground surface. The main parachute 208 may deploy after the drogue 210 and may provide further reduction of the velocity of at least one of the seat 204 or the user 202 as it travels towards the ground surface.

The seat 204 may include a bucket portion 212 on which a user sits and which supports a bulk of the weight of the user 202. The bucket portion 212 may have any shape on which a user may sit such as a flat shape, a curved shape, or the like.

Referring now to FIGS. 2A, 2B, 3A, and 3B, a system 300 may automatically adjust features of the ejection system 200 based on received user input. The system 300 may include a controller 302. The controller 302 may include one or more logic devices such as one or more of a central processing unit (CPU), an accelerated processing unit (APU), a digital signal processor (DSP), a field programmable gate array (FPGA), an application specific integrated circuit (ASIC), or the like. In various embodiments, the controller 302 may further include any non-transitory memory known in the art. The memory may store instructions usable by the logic device to perform operations.

The system 300 may further include a database or remote memory 304. The database 304 may be located on a same aircraft as the system 300 or may be located remote from the system 300. The controller 302 may communicate with the database 304 via any wired or wireless protocol. In that regard, the controller 302 may access data stored in the database 304. The database 304 may store any information as requested by the controller 302, as discussed further below. In various embodiments, the memory of the controller 302 may be used in place of the database 304.

The system 300 may further include a weight sensor 214. The weight sensor 214 may include any sensor capable of detecting data corresponding to a weight of the user 202. Where used herein, "weight" may refer to weight, mass, or another value that corresponds to the weight or mass of the user. In various embodiments, the weight sensor 214 may be coupled to the bucket portion 212 and detect data corresponding to a weight or pressure applied to the bucket portion 212. In various embodiments, the weight sensor 214 may detect data corresponding to a weight or pressure applied to the entire seat 204. For example, the weight sensor 214 may detect a weight or mass of the user 202 directly, may detect pressure applied by the user 202 such that the controller 302 may calculate the weight of the user 202 based on the detected pressure, or the like. In various embodiments, the weight sensor 214 may include an actuator, as further described below. In various embodiments, the weight or mass of the user 202 or the data corresponding to the weight or mass of the user 202 may be stored in the database 304. The weight sensor 214 may include, for example, a strain gauge sensor, a capacitance sensor, a hydraulic sensor, a pneumatic sensor, or any other sensor capable of detecting data corresponding to a weight of the user 202.

The system 300 may further include an input device 216. The input device 216 may include any input device such as a button, a knob, a dial, a lever, or the like. The input device 216 may receive input from the user 202 or from another individual corresponding to a desired position, orientation, height, or other setting of the seat 204. The controller 302 may control various actuators of the seat 204 based on the received input. For example, the input device 216 may receive input corresponding to a desired height 330 of the bucket portion 212. The controller 302 may control a seat height actuator, or actuator, 336 to adjust the height 330 of the bucket portion 212. In various embodiments, the actuator 336 may include a motor, engine, linear actuator, rotary actuator, or other actuator capable of adjusting the height 330.

In various embodiments, the actuator 336 may determine an amount of force required to cause the bucket portion 212 to remain at a same height 330, or to change the height 330 by a predetermined amount. For example, after the input device 216 ceases receiving user input to change the height 330, the actuator 336 may continue applying force to cause the bucket portion 212 to remain at the same height 330. The actuator 336 or the controller 302 may record or store the amount of force to keep the bucket portion 212 at the same height 330, and the controller 302 may determine or calculate the weight or mass of the user 202 based on the determined amount of force.

The amount of force to keep the bucket portion 212 at the same height 330 may vary based on a temperature at which the actuator 336 is exposed. In that regard, the system 300 may further include a temperature sensor 218 designed to detect a temperature of the environment of the actuator 336. The controller 302 may receive the temperature and may adjust the calculation of the weight or mass of the user 202 based on the detected temperature.

The controller 302 may control or adjust the various settings of the ejection system 200 based on the weight of the user 202. In particular, the controller 302 may directly control the various settings of the ejection system 200, or may provide instructions to components of the ejection system 200 and those components may adjust the settings. For example, the ejection system 200 may include a seat electronic sequencer 324, a seat electronic position controller 326, an interseat electronic sequencer 338, and the like. Each of the seat electronic sequencer 324, the seat electronic position controller 326, and the interseat electronic sequencer 338 may include one or more logic devices such as one or more of a central processing unit (CPU), an accelerated processing unit (APU), a digital signal processor (DSP), a field programmable gate array (FPGA), an application specific integrated circuit (ASIC), or the like. In various embodiments, these elements may further include any non-transitory memory known in the art. The seat electronic sequencer 324, the seat electronic position controller 326, and the interseat electronic sequencer 338 may be coupled to the controller 302 and may receive the weight of the user determined or calculated by the controller 302, or may receive instructions regarding adjustments of components of the ejection system 200 from the controller 302.

The seat electronic sequencer 324 may make adjustments to components of the ejection system 200 that alter a sequence or timing of ejection events such as settings associated with the drogue 210, the main parachute 208, and a thrust angle of the seat 204 during ejection. For example, the seat electronic sequencer 324 may set a parachute deployment timing corresponding to a delay between ejection and deployment of the main parachute 208. The seat electronic sequencer 324 may further set a drogue deployment timing corresponding to a delay between ejection and deployment of the drogue 210. The seat electronic sequencer 324 may further adjust the angle of the seat 204 relative to the fuselage 102 of FIG. 1 during ejection of the seat 204 from the cockpit 104.

The seat electronic position controller 326 may make adjustments to components of the ejection system 200 that affect a position of a user within the system 200 such as positions of various elements of the seat 204. For example, the seat electronic position controller 326 may adjust a position of a headrest 328 (e.g., in any two or more directions corresponding to a front of an aircraft, a rear of an aircraft, closer to a floor surface 331, farther from the floor surface 331, towards a starboard side, and towards a port side). The seat electronic position controller 326 may further control the seat height actuator 336 to adjust the height 330 of the bucket portion 212 of the seat 204 (e.g., to increase or decrease the seat height 330). The seat electronic position controller 326 may further adjust a rail angle 333 corresponding to an angle between seat rails 332 and the floor surface 331. The seat electronic position controller 326 may further adjust a lumbar support 334 to extend closer to or farther from a surface 335 of a backrest 337. In various embodiments, the controller 302 may avoid controlling settings of the seat electronic position controller 326 based on the weight of the user 202 as the weight of the user 202 may be less applicable to the settings controlled by the seat electronic position controller 326.

The interseat electronic sequencer 338 may make adjustments to components of the ejection system 200 that affect an interseat timing between components. For example, the interseat electronic sequencer 338 may adjust a timing or delay between ejection of the seat 204 and separation of at least one of a hatch or canopy (e.g., the hatch or canopy 106, 110 of FIG. 1) from the respective fuselage, or adjust a delay between ejection of two or more cockpits (e.g., between the first cockpit 104 and the second cockpit 108 of FIG. 1). For example, it may be desirable for a different timing to be used for a heavier user relative to a lighter user. The interseat electronic sequencer 338 may select an order of ejection between two or more cockpits based on the weight of two or more users. As another example, it may be desirable for a different timing to be used for a heavier user relative to a lighter user. In that regard, the interseat electronic sequencer 338 may select a timing for a user to eject relative to separation of a hatch or canopy from a fuselage based on the weight of the user.

As alluded to above, the various adjustable settings of the ejection system 200 may vary based on the weight of the user 202 (e.g., as detected by the weight sensor 214, determined by the controller 302, or stored in the database 304). The controller 302 or one or more of the seat electronic sequencer 324, the seat electronic position controller 326, or the interseat electronic sequencer 338 may select values for the various adjustable settings based on the weight of the user 202. In various embodiments, specific settings controlled by the seat electronic sequencer 324, the seat electronic position controller 326, or the interseat electronic sequencer 338 may be stored in the database 304 as being associated with the weight of the user 202 or a weight range in which the weight of the user 202 falls.

Due to the fact that a weight detected by weight sensor 214 (or by the actuator 336) may vary in response to various flight patterns, the weight sensor 214 or the actuator 336 may detect the weight of the user 202 while the aircraft is located on a ground surface. In various embodiments, the weight sensor 214 (or the actuator 336) may only detect the weight while the aircraft is on the ground and not moving. In various embodiments, the weight sensor 214 (or the actuator 336) may continuously or periodically detect the weight, but the controller 302 may only adjust the various adjustable settings of the ejection system 200 based on a weight detected while at least one of the aircraft is on the ground or the aircraft is on the ground and not moving.

Figure 4:
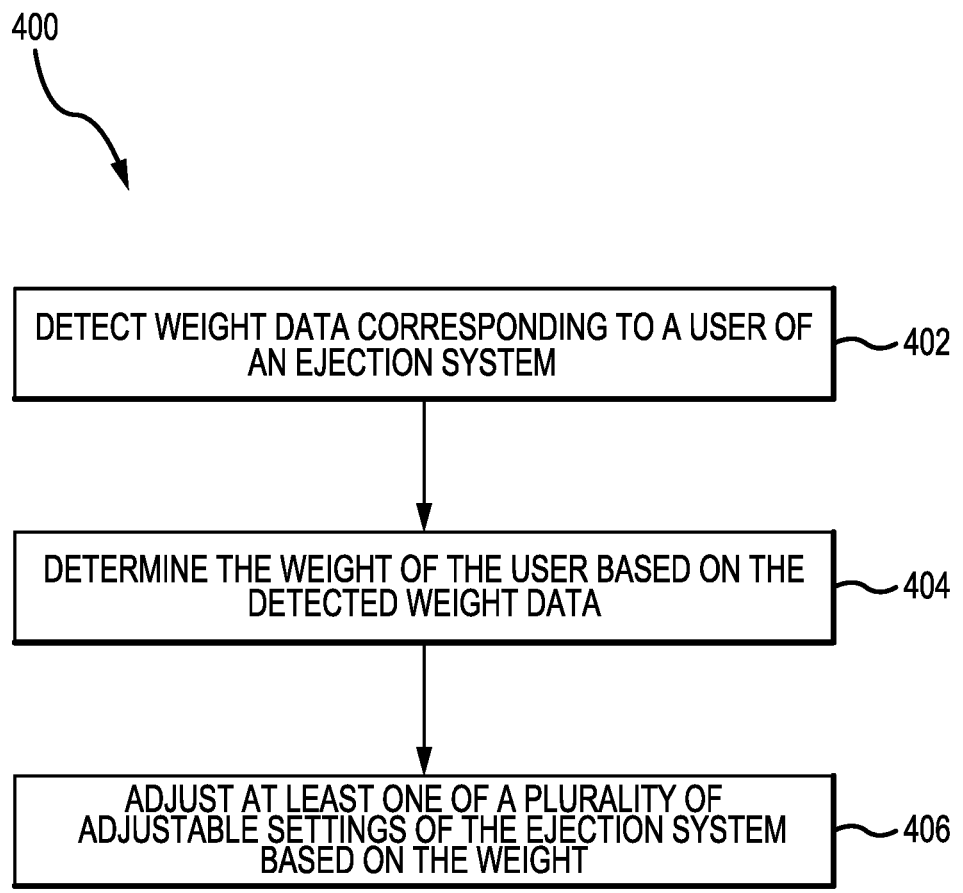
FIG. 4 is a flowchart illustrating a method for automatic adjustment of various settings of an ejection system based on a detected weight of a user, in accordance with various embodiments.

Referring now to FIG. 4, a flowchart illustrates a method 400 for automatic adjustment of an ejection system based on a detected weight of a user. The method 400 may be performed by components of a system similar to the system 300 of FIGS. 2A, 2B, 3A, and 3B. The method 400 may begin in block 402 where data corresponding to a weight of the user is detected. As discussed above, the weight sensor may include a weight or pressure sensor configured to detect a weight or pressure applied to a seat of the ejection system by the user, an actuator, or the like.

In block 404, a controller of the system may determine the weight of the user based on the detected weight data. For example, the controller may analyze a voltage signal received from the weight sensor and may calculate the weight of the user based on the voltage signal. As another example, the controller may determine an amount of pressure applied to a pressure sensor and may determine the weight of the user based on the amount of pressure.

In block 406, the controller may adjust at least one of a plurality of adjustable settings (e.g., those described above with reference to the seat electronic sequencer, the seat electronic position controller, and the interseat electronic sequencer) based on the specific settings retrieved from the database. As mentioned above and in various embodiments, the controller may only adjust settings corresponding to the seat electronic sequencer or the interseat electronic sequencer.

Figure 5:
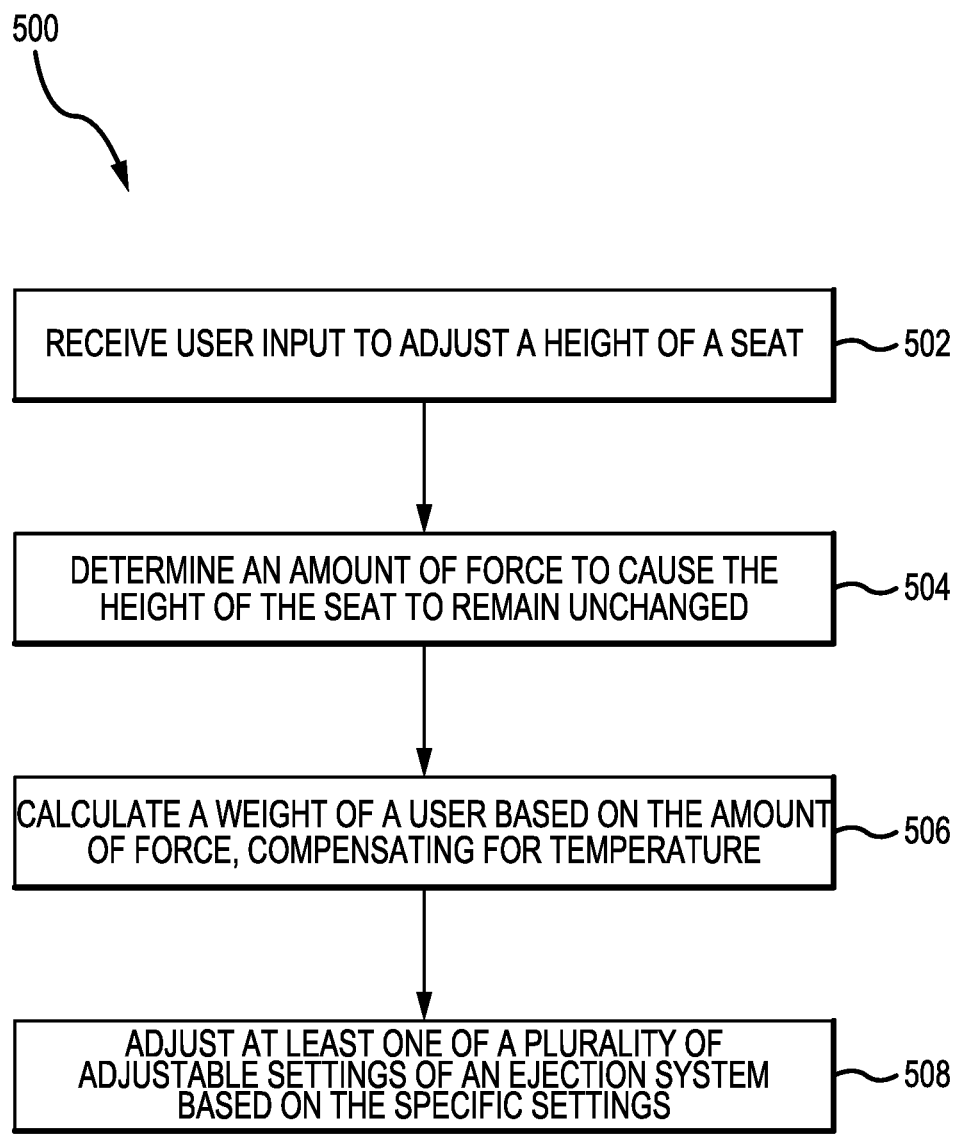
FIG. 5 is a flowchart illustrating a method for automatic adjustment of various settings of an ejection system based on a detected weight of a user, in accordance with various embodiments.

Referring now to FIG. 5, a flowchart illustrates a method 500 for automatic adjustment of an ejection system based on a weight of a user. The method 500 may be performed by components of a system similar to the system 300 of FIGS. 2A, 2B, 3A, and 3B. The method 500 may begin in block 502 where an input device of the system may receive user input corresponding to a request to adjust a height of a seat of the ejection system. For example, the input may correspond to a request to adjust a height of a bucket portion of the seat. In response to receiving the input, an actuator of the seat may actuate to adjust the height of the seat.

In block 504, a controller of the system or the actuator may determine an amount of force used to cause the height of the seat to remain unchanged. For example, the actuator may continue to apply force for a period of time after the input device ceases receiving the input. The controller or the actuator may determine the amount of force applied during this time that causes the height of the seat to remain unchanged.

In block 506, the controller may calculate a weight of the user based on the amount of force determined in block 504. In various embodiments, the controller may further receive a detected temperature corresponding to the environment of the actuator, and the controller may adjust or compensate the calculated weight based on the detected temperature.

In block 508, the controller may adjust at least one of a plurality of adjustable settings (e.g., those described above with reference to the seat electronic sequencer, the seat electronic position controller, and the interseat electronic sequencer) based on the weight calculated in block 506.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for automatic adjustment of an ejection system for an aircraft, the system comprising:
    the ejection system having a plurality of adjustable settings;
    a seat having a bucket portion;
    a sensor, wherein the sensor includes at least one pressure sensor coupled to the bucket portion and configured to detect a pressure applied to the bucket portion of the seat; and
    a controller coupled to the ejection system and to the sensor and configured to:
        determine weight data based on the detected pressure; and
        adjust at least one of the plurality of the adjustable settings of the ejection system based on the weight data.

2. The system of claim 1, wherein the controller is further configured to:
    control an actuator configured to exert a force to adjust a height of the bucket portion.

3. The system of claim 2, wherein the weight data includes an amount of force required to cause the height of the bucket portion to remain unchanged.

4. The system of claim 3, wherein the controller is further configured to calculate the weight of the user based on the amount of force required to cause the height of the bucket portion to remain unchanged.

5. The system of claim 4, wherein the controller is further configured to compensate for a current temperature in response to calculating the weight of the user.

6. The system of claim 4, further comprising an input device configured to receive a desired adjustment to the height of the bucket portion, wherein the controller is configured to select the amount of force at a time at which the height of the bucket portion remains unchanged during an adjusting process of the height of the bucket portion.

7. The system of claim 1, wherein the ejection system includes a seat electronic sequencer and the plurality of the adjustable settings include at least one of a parachute deployment timing, a drogue deployment timing, or a thrust angle alignment.

8. The system of claim 1, wherein the ejection system includes an interseat electronic sequencer and the plurality of the adjustable settings include an interseat timing.

9. A system for automatic adjustment of an ejection system for an aircraft, the system comprising:
    the ejection system having a plurality of adjustable settings;
    a seat having a bucket portion in which a user of the ejection system rests;
    a sensor coupled to the seat and, wherein the sensor includes at least one pressure sensor coupled to the bucket portion and configured to detect a pressure applied to the bucket portion of the seat; and
    a controller coupled to the ejection system and to the sensor and configured to:
        determine weight data based on the detected pressure; and
        adjust at least one of the plurality of the adjustable settings of the ejection system based on the weight data.

10. The system of claim 9, wherein the controller is further configured to:
    control an actuator to exert a force to adjust a height of the bucket portion, wherein the weight data includes an amount of force required to cause the height of the bucket portion to remain unchanged.

11. The system of claim 10, wherein the controller is further configured to calculate the weight of the user based on the amount of force required to cause the height of the bucket portion to remain unchanged, and wherein the controller is further configured to compensate for a current temperature in response to calculating the weight of the user.

12. A method for automatic adjustment of an ejection system of an aircraft, the method comprising:
    detecting, by a sensor, a pressure applied a the bucket portion of a seat of the ejection system, wherein the sensor is a pressure sensor;
    determine, by a controller, weight data based on the detected pressure; and
    adjusting, by the controller, at least one of a plurality of adjustable settings of the ejection system based on the weight data.

13. The method of claim 12, wherein the method further comprises:
    controlling, by the controller, an actuator to exert a force to adjust a height of a bucket portion of a seat based on the weight data.

14. The method of claim 13, wherein detecting the weight data includes detecting an amount of force required to cause the height of the bucket portion to remain unchanged.

15. The method of claim 14, further comprising calculating, by the controller, the weight of the user based on the amount of the force required to cause the height of the bucket portion to remain unchanged.

16. The method of claim 15, wherein calculating the weight of the user further includes compensating for a current temperature of the actuator.

17. The method of claim 15, further comprising receiving, by an input device, a desired adjustment to the height of the bucket portion, wherein calculating the weight of the user includes selecting the amount of force at a time at which the height of the bucket portion remains unchanged during an adjusting process of the height of the bucket portion.

* * * * *

UNITED STATES PATENT AND TRADEMARK OFFICE
CERTIFICATE OF CORRECTION

| | |
|---|---|
| PATENT NO. | : 11,518,527 B2 |
| APPLICATION NO. | : 17/036229 |
| DATED | : December 6, 2022 |
| INVENTOR(S) | : Ronald John McCumber |

It is certified that error appears in the above-identified patent and that said Letters Patent is hereby corrected as shown below:

In the Claims

Claim 12, Column 10, Line 24: after the word "applied" please delete "a" and insert --to--

Signed and Sealed this
Eighteenth Day of April, 2023

Katherine Kelly Vidal
*Director of the United States Patent and Trademark Office*